United States Patent
Arumugam

(10) Patent No.: US 9,258,749 B1
(45) Date of Patent: Feb. 9, 2016

(54) SYSTEMS AND METHODS FOR RECOVERY AFTER RADIO LINK FAILURE

(71) Applicant: QUALCOMM Incorporated, San Diego, CA (US)

(72) Inventor: Bhaskaran Arumugam, Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/595,014

(22) Filed: Jan. 12, 2015

(51) Int. Cl.
 H04W 36/00 (2009.01)
 H04W 56/00 (2009.01)
 H04L 5/00 (2006.01)
 H04W 24/10 (2009.01)

(52) U.S. Cl.
 CPC ........... *H04W 36/0061* (2013.01); *H04L 5/006* (2013.01); *H04W 24/10* (2013.01); *H04W 56/00* (2013.01)

(58) Field of Classification Search
 None
 See application file for complete search history.

(56) References Cited

U.S. PATENT DOCUMENTS

| | | | | |
|---|---|---|---|---|
| 6,532,363 B1* | 3/2003 | Pussinen | ........... | H04W 36/0061 455/435.1 |
| 7,792,537 B2* | 9/2010 | Wilborn | ............ | H04W 36/0088 370/320 |
| 8,457,624 B2 | 6/2013 | Snow et al. | | |
| 8,958,281 B2* | 2/2015 | Yang | ...................... | H04W 36/14 370/216 |
| 8,958,392 B2* | 2/2015 | Yang | ...................... | H04W 24/10 370/252 |
| 2009/0196168 A1 | 8/2009 | Aydin et al. | | |
| 2010/0002611 A1* | 1/2010 | Umatt | ............... | H04W 52/0241 370/311 |
| 2011/0039546 A1 | 2/2011 | Narasimha et al. | | |
| 2011/0053586 A1* | 3/2011 | Snow | ...................... | H04W 76/02 455/423 |
| 2011/0080825 A1 | 4/2011 | Dimou et al. | | |
| 2013/0051214 A1 | 2/2013 | Fong et al. | | |
| 2013/0308481 A1* | 11/2013 | Kazmi | ................... | H04W 24/02 370/252 |
| 2015/0124728 A1* | 5/2015 | Bergstrom | ............. | H04L 5/001 370/329 |

* cited by examiner

*Primary Examiner* — Diane Mizrahi
(74) *Attorney, Agent, or Firm* — Austin Rapp & Hardman

(57) ABSTRACT

Embodiments of the present invention include devices, systems and methods for recovery after radio link failure (RLF). For example, a method for wireless communication is described. The method includes performing a base station identity code (BSIC) reconfirmation for a number of top ranked cells in a received neighbor cell list when a radio link timeout (RLT) counter is less than a counter threshold before radio link failure (RLF). A signal-to-noise ratio (SNR) for the top ranked cells is determined during the BSIC reconfirmation. The method also includes scheduling a system information (SI) decode upon RLF for the top ranked cells that have an SNR greater than an SNR threshold. Other aspects, embodiments, and features are also claimed and described.

30 Claims, 8 Drawing Sheets

SYSTEMS AND METHODS FOR RECOVERY AFTER RADIO LINK FAILURE

TECHNICAL FIELD

The technology discussed below relates generally to communication systems, and more specifically to systems and methods for recovery after radio link failure (RLF). Implementation of certain aspects of the technology discussed below can enable improved communication network selection and efficient use of power resources.

BACKGROUND

Wireless communication systems have become an important means by which many people worldwide have come to communicate. A wireless communication system may provide communication for a number of wireless communication devices, each of which may be serviced by a base station.

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices.

As wireless communication devices have become more widely deployed, the number of communication systems available has also increased. Inefficiencies may arise when scanning for communication systems. Accordingly, systems and methods that may help to reduce these inefficiencies may be beneficial.

BRIEF SUMMARY OF SOME EXAMPLES

Embodiments of the present invention address the above issues as well as others. Indeed, embodiments of the present invention provide power efficient devices, systems, and methods that can alleviate time delays. Doing so can not only utilize power resources efficiently but can aid in minimizing delays associated with network communications.

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method for wireless communication is described. The method includes performing a base station identity code (BSIC) reconfirmation for a number of top ranked cells in a received neighbor cell list when a radio link timeout (RLT) counter is less than a counter threshold before radio link failure (RLF). A signal-to-noise ratio (SNR) for the top ranked cells is determined during the BSIC reconfirmation. The method also includes scheduling a system information (SI) decode upon RLF for the top ranked cells that have an SNR greater than an SNR threshold.

The method may also include decoding, upon RLF, the SI of a top ranked cell with a highest SNR without performing a power scan. The method may further include camping on the top ranked cell with the highest SNR.

The method may also include delaying additional BSIC reconfirmations for the top ranked cells for a time period when the RLT counter is greater than zero and less than the counter threshold.

The top ranked cells may be determined based on receive levels of cells in the neighbor cell list. The BSIC reconfirmation for the top ranked cells may be performed in a dedicated mode before RLF. The RLT counter may be incremented or decremented based on slow associated control channel (SACCH) decoding. Performing a BSIC reconfirmation may include decoding a synchronization channel (SCH).

The counter threshold may be 2, the number of top ranked cells may be 3 cells, and the SNR threshold may be −6 decibels.

The method may be performed by a wireless communication device in a GSM network. The wireless communication device may be a dual-SIM dual-standby (DSDS) device.

An electronic device for wireless communication is also described. The electronic device includes a processor, memory in electronic communication with the processor, and instructions stored in the memory. The instructions are executable by the processor to perform a BSIC reconfirmation for a number of top ranked cells in a received neighbor cell list when a RLT counter is less than a counter threshold before RLF. A SNR for the top ranked cells is determined during the BSIC reconfirmation. The instructions are also executable to schedule a SI decode upon RLF for the top ranked cells that have an SNR greater than an SNR threshold.

A wireless device is also described. The wireless device includes means for performing a BSIC reconfirmation for a number of top ranked cells in a received neighbor cell list when a RLT counter is less than a counter threshold before RLF. A SNR for the top ranked cells is determined during the BSIC reconfirmation. The wireless device also includes means for scheduling a SI decode upon RLF for the top ranked cells that have an SNR greater than an SNR threshold.

A computer-program product is also described. The computer-program product includes a non-transitory computer-readable medium having instructions thereon. The instructions include code for causing an electronic device to perform a BSIC reconfirmation for a number of top ranked cells in a received neighbor cell list when a RLT counter is less than a counter threshold before RLF. A SNR for the top ranked cells is determined during the BSIC reconfirmation. The instructions also include code for causing the electronic device to schedule a SI decode upon RLF for the top ranked cells that have an SNR greater than an SNR threshold.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
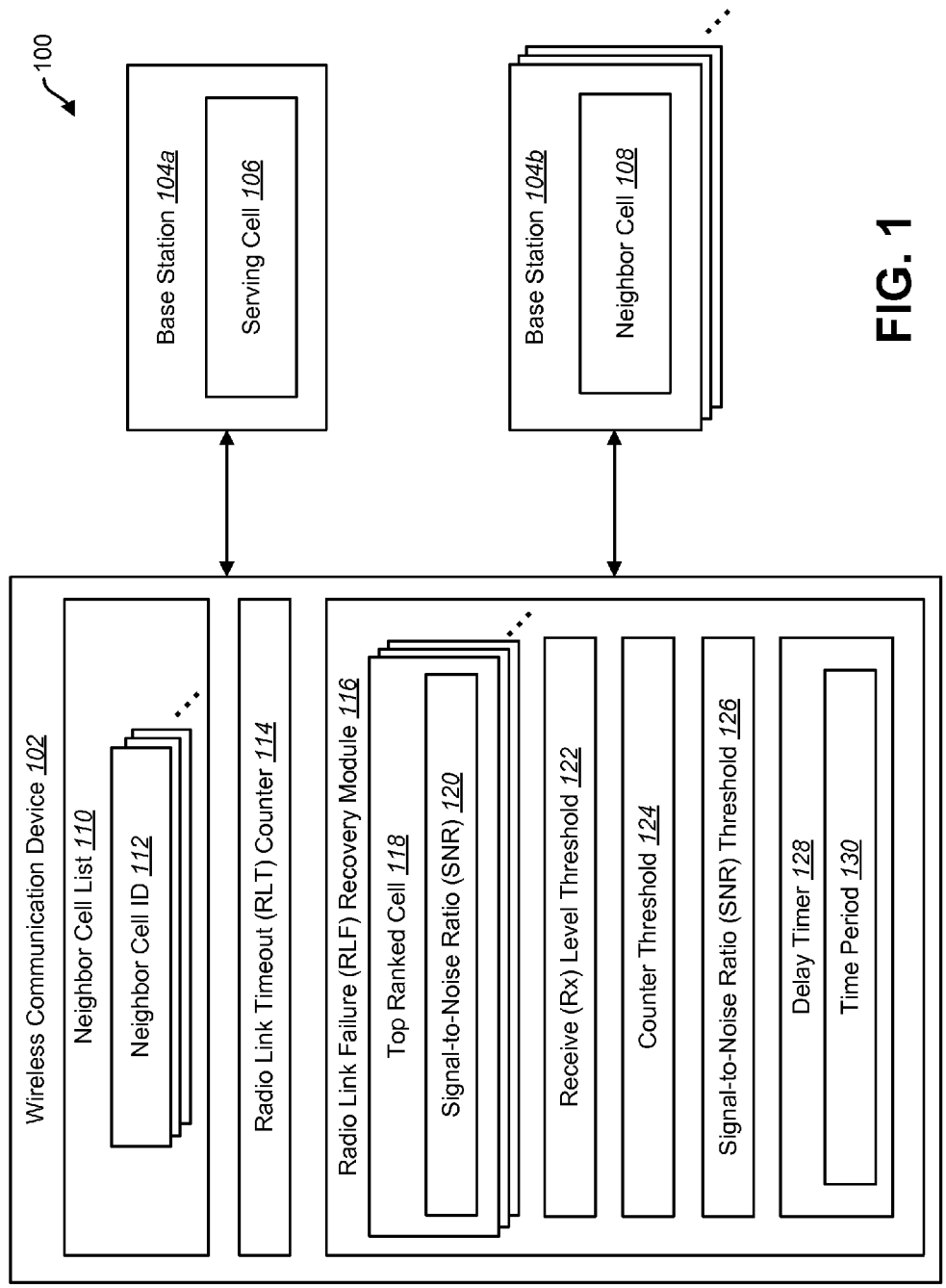
FIG. 1 is a block diagram illustrating a wireless communication system in which systems and methods for recovery after radio link failure (RLF) may be implemented according to some embodiments.

FIG. 1 is a block diagram illustrating a wireless communication system 100 in which systems and methods for recovery after radio link failure (RLF) may be implemented according to some embodiments. The wireless communication system 100 may include one or more wireless communication device 102 and base stations 104.

A base station 104 is a device that may communicate with one or more wireless communication devices 102. A base station 104 may also be referred to as, and may include some or all of the functionality of, an access point, a broadcast transmitter, a NodeB, an evolved NodeB (eNB), a base transceiver station, etc. Each base station 104 may provide communication coverage for a particular geographic area (GEO). A base station 104 may provide communication coverage for one or more wireless communication devices 102.

A base station 104 may provide one or more cells. The term "cell" can refer to a base station 104 and/or the coverage area of a base station 104 depending on the context in which the term is used. A base station 104 may provide one or more cells. For example, a first base station 104 may provide a first cell and a second base station 104 may provide a second cell. In another configuration, a single base station 104 may provide multiple cells.

The wireless communication device 102 may also be referred to as, and may include some or all of the functionality of, a terminal, an access terminal, a subscriber unit, a station, a user equipment (UE), etc. Examples of the wireless communication device 102 may include a cellular phone, a personal digital assistant (PDA), a wireless device, a wireless modem, a handheld device, a laptop computer, a session initiation protocol (SIP) phone, a wireless local loop (WLL) station, entertainment device, appliance, business/household device, visual display, automotive/vehicle component, sensor, actuator, solar array, etc.

A wireless communication device 102 and base station 104 may operate in accordance with certain industry standards, such as Global System for Mobile Communications (GSM) standards. Other examples of standards that a communication device may comply with include Third Generation Partnership Project (3GPP) Long Term Evolution (LTE) standards, Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standards, Code Division Multiple Access (CDMA) 2000 1× (referred to herein as "1×", may also be referred to as IS-2000 or 1×RTT) standards, Evolution-Data Optimized (EVDO) standards, Interim Standard 95 (IS-95), High Rate Packet Data (HRPD), evolved High Rate Packet Data (eHRPD) radio standards and others. While some of the systems and methods disclosed herein may be described in terms of one or more standards, this should not limit the scope of the disclosure, as the systems and methods may be applicable to many systems and/or standards.

The terms "networks" and "systems" are often used interchangeably. A CDMA network may implement a radio access technology (RAT) such as Universal Terrestrial Radio Access (UTRA), CDMA2000, etc. UTRA includes W-CDMA and Low Chip Rate (LCR) while CDMA2000 covers IS-2000, IS-95 and IS-856 standards. A TDMA network may implement a radio access technology (RAT) such as Global System for Mobile Communications (GSM). An orthogonal frequency division multiple access (OFDMA) network may implement a radio access technology (RAT) such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). Additionally, CDMA2000 is described in documents from an organization named "3rd Generation Partnership Project 2" (3GPP2).

A wireless communication device 102 may communicate with one or more base stations 104 on a downlink and/or an uplink at any given moment. The downlink (or forward link) refers to the communication link from a base station 104 to a wireless communication device 102, and the uplink (or reverse link) refers to the communication link from a wireless communication device 102 to a base station 104.

Communications between the wireless communication device 102 and base station 104 may be achieved through transmissions over a wireless link. Such a communication link may be established via a single-input and single-output (SISO), multiple-input and single-output (MISO) or a multiple-input and multiple-output (MIMO) system. A multiple-input and multiple-output system includes transmitter(s) and receiver(s) equipped, respectively, with multiple ($N_T$) transmit antennas and multiple ($N_R$) receive antennas for data transmission. Single-input and single-output and multiple-input and single-output systems are particular instances of a multiple-input and multiple-output system. The multiple-input and multiple-output system can provide improved performance (e.g., higher throughput, greater capacity or improved reliability) if the additional dimensionalities created by the multiple transmit and receive antennas are utilized.

The wireless communication device 102 may be configured with multi-mode capabilities and may include multiple transceivers for communicating with different wireless networks over different wireless links/radio access technologies (RATs). The wireless communication device 102 may be configured to communicate over multiple wireless data networks on different subscriptions (SUBs), such as in a multi-subscriber identity module (SIM) wireless device. For example, the wireless communication device 102 may be configured with dual-SIM dual-standby (DSDS) capability, which enables a dual-SIM device to simultaneously participate in two independent communications sessions, generally though a shared transmit/receive chain. In another configuration of a multi-SIM device, a triple-SIM triple-standby (TSTS) device (e.g., a device with three SIMs) may simultaneously participate in three independent communications sessions, generally through a shared transmit/receive chain.

DSDS devices include two SIMs that enable a user to connect to two different mobile networks (or different accounts on the same network) while using the same DSDS device. TSTS devices include three SIMs that enable a user to connect to three different mobile networks (or different accounts on the same network) while using the same TSTS device. Each SIM serves to identify and authenticate a subscriber using a particular multi-SIM device, and each SIM is associated with only one subscription. For example, a SIM may be associated with a subscription to one of GSM, TD-SCDMA, CDMA2000, and WCDMA.

The wireless communication device 102 may be camped on a serving cell 106. The term "camp" refers to a process in which the wireless communication device 102 monitors a cell for system information and paging information. The wireless communication device 102 may receive paging information on a paging channel. The cell on which the wireless communication device 102 is camped is referred to as the serving cell 106. A base station 104a may provide the serving cell 106.

One or more other base stations 104b (e.g., neighbor base stations 104b) may provide neighbor cells 108. The wireless communication device 102 may not be currently camped on a neighbor cell 108. The wireless communication device 102 may attempt to camp on a neighbor cell 108 in the event that the serving cell 106 becomes unsuitable. For example, the wireless communication device 102 may camp on a neighbor cell 108 during handover, during cell reselection, or upon radio link failure (RLF). Upon camping on a neighbor cell 108, the neighbor cell 108 becomes a serving cell 106.

In some scenarios, the wireless communication device 102 may operate in a dedicated mode. The dedicated mode may also be referred to as a connected mode. During the dedicated mode, the wireless communication device 102 may be in a voice call or a data call.

While in the dedicated mode, the wireless communication device 102 may receive a neighbor cell list 110 from the serving cell 106. In one embodiment, the neighbor cell list 110 may be a broadcast control channel (BCCH) allocation (BA) list. The wireless communication device 102 may receive the neighbor cell list 110 in a system information block type 5 (SIB 5) through a downlink (DL) slow associated control channel (SACCH).

The neighbor cell list 110 may include neighbor cell identifications (IDs) 112 that identify the neighbor cells 108. A neighbor cell ID 112 may include a frequency of a neighbor cell 108. In one embodiment, the neighbor cell ID 112 may be an absolute radio frequency channel number (ARFCN). The neighbor cell IDs 112 in the neighbor cell list 110 may be the defined neighbor cells 108 for the serving cell 106 to which handover is triggered by the network.

The wireless communication device 102 may include a radio link timeout (RLT) counter 114. The RLT counter 114 may also be referred to as a radio link counter or S counter. The RLT counter 114 may be incremented or decremented based on SACCH decoding by the wireless communication device 102. In one embodiment, the defined value of the RLT counter 114 may be determined from system information 6 acquired through DL SACCH. The RLT counter 114 may be reduced by 1 for every DL SACCH decode failure. The RLT counter 114 may be increased by 2 for every successful decode until the defined value of the RLT counter. In GSM, the wireless communication device 102 may declare a RLF once the RLT counter 114 becomes zero as a result of SACCH decode failures.

In one approach, once a wireless communication device 102 declares RLF, the wireless communication device 102 may perform a power scan for the neighbor cells 108 included in the neighbor cell list 110. The wireless communication device 102 may perform a power scan on the frequencies in the neighbor cell list 110. In one embodiment, the wireless communication device 102 may determine whether the neighbor cells 108 meet a power scan threshold. The receive (Rx) level of a power scan may be expressed as a power ratio in decibels (dB) of the measured power referenced to one milliwatt (mW) (dBm). In one implementation, the power scan threshold may be −107 dBm.

The wireless communication device 102 may perform a frequency correction channel (FCCH) decode and a synchronization (SCH) decode for the one or more neighbor cells 108 that meet the power scan threshold. The wireless communication device 102 may select a neighbor cell 108 with a good receive (Rx) level and may start decoding system information (SI) for camping to the neighbor cell 108. The wireless communication device 102 may also attempt call re-establishment if supported by the network.

If there are no cells found that are suitable to camp on, then the wireless communication device 102 may perform a full power scan to search for a cell on which to camp. After the power scan, the wireless communication device 102 may attempt call re-establishment if supported by the network.

In this approach, the wireless communication device 102 may be delayed in selecting a cell to camp on by over one second. Furthermore, scheduling and selection of the cell is also delayed by this duration. A power scan of the frequencies in the neighbor cell list 110 may take around 100 milliseconds (ms) or more after RLF depending on how many cells pass the power scan threshold (e.g., −107 dBm). Once the power scan is done, then the FCCH and SCH decode are scheduled and cell selection occurs. This in turn delays the camping and the call re-establishment process.

In this approach, recovery is triggered only after RLF. In many instances, this may result in call re-establishment failure because the camping on a cell is delayed and the network may lose the call context. Furthermore, for a wireless communication device that supports DSDS, this also results in a delayed power scan on the second subscription (SUB2) in the case of long duration call drops. In this case, SUB2 may need to reacquire service. There is also higher power usage since the wireless communication device 102 performs a power scan after RLF. Therefore, benefits may be realized by performing an enhanced recovery after RLF.

The wireless communication device 102 may include a RLF recovery module 116. The RLF recovery module 116 may use the RLT counter 114 for planning a recovery after RLF. The RLF recovery module 116 may determine one or more top ranked cells 118 based on the Rx levels of cells in the neighbor cell list 110. In one configuration, the wireless communication device 102 makes measurements of the Neighbor cells 108 BCCH channel and reports in a SACCH measurement report every 480 ms. These measurements may be used for ranking the neighbor cells 108. The RLF recovery module 116 may evaluate the Rx levels of the cells in the neighbor cell list 110 and sort the neighbor cells 108 by Rx level.

The RLF recovery module 116 may determine a number of top ranked cells 118 with the highest Rx level. The number of top ranked cells 118 may be configurable. In one embodiment, the number of top ranked cells 118 is 3. To reduce the chance of cell selection failure after RLF, the Rx level of the top ranked cells 118 should be better than an Rx level threshold 122. In one implementation, the Rx level threshold 122 may be −107 dBm.

The RLF recovery module 116 may keep track of the RLT counter 114. The RLF recovery module 116 may schedule a base station identity code (BSIC) reconfirmation for the top ranked cells 118 when the RLT counter 114 is less than a counter threshold 124 before RLF. The wireless communication device 102 may perform a BSIC reconfirmation of the top ranked cells 118 before the RLT counter 114 reaches 0 and RLF is declared. Furthermore, the wireless communication device 102 may perform the BSIC reconfirmation of the top ranked cells 118 while in dedicated mode.

In one embodiment, a BSIC reconfirmation procedure is a procedure in which the wireless communication device 102 tracks and decodes the BSIC of a cell's (e.g., neighbor cell 108) synchronization channel (SCH) after an initial BSIC identification. The BSIC reconfirmation may also include comparing the decoded BSIC of the cell's SCH with the BSIC indicated in an RRC message. The BSIC is reconfirmed when the BSIC of the cell's SCH matches the BSIC indicated in the RRC message.

The RLF recovery module 116 may determine the signal-to-noise ratio (SNR) 120 for each top ranked cell 118 during the BSIC reconfirmation. As mentioned, the wireless communication device 102 may decode the SCH of a neighbor cell 108. Once the SCH of a top ranked cell 118 is decoded, the wireless communication device 102 may determine the SNR 120 of the top ranked cells 118. The wireless communication device 102 may store the SNR 120 for the respective neighbor cell ID 112 (e.g., ARFCN).

In one implementation, the counter threshold 124 is 2. In this implementation, the RLT counter 114 may become 0 only after 960 ms (i.e., 2 failed SACCH decodes, minimum). In this implementation, the BSIC reconfirmation can be scheduled anywhere within the next 960 ms (i.e., approximately 208 frame duration) after the RLT counter 114 reaches 2.

Upon RLF (e.g., when the RLT counter 114 reaches 0), the RLF recovery module 116 may schedule a system information (SI) decode for the top ranked cells 118 that have an SNR 120 greater than an SNR threshold 126. For example, the wireless communication device 102 may decode one or more of system information type 1, 3, 5, 11, and 13. Under RLF, the wireless communication device 102 may immediately try to decode the system information (e.g., system information blocks (SIB)) of the top ranked cells 118. To avoid the scenario where a top ranked cell 118 has a poor SNR 120, the SNR threshold 126 may be kept to greater than 6 dB. Call re-establishment may be attempted in parallel with the SI decode. The wireless communication device 102 may decode the SI of the top ranked cells 118 without performing a power scan.

Once the wireless communication device 102 decodes the SI of top ranked cells 118, the wireless communication device 102 may attempt to camp on the neighbor cell 108 with the highest SNR 120. If the system information decode fails, this may mean that there is no available neighbor cell 108 in the top ranked cells 118. In this case, a power scan may be performed as described above.

In order to avoid a ping pong effect, the wireless communication device 102 may delay additional BSIC reconfirmations for the top ranked cells 118 when the RLT counter 114 is less than the counter threshold 124. As described above, when the RLT counter 114 is less than the counter threshold 124, the wireless communication device 102 may perform a BSIC reconfirmation. However, the RLT counter 114 may rise above the counter threshold (in the case of a successful SACCH decode) for a time and may again fall below the counter threshold 124 (in the case of unsuccessful SACCH decodes).

It may be undesirable to repeat BSIC reconfirmation within a short time frame. To address this ping pong effect, the wireless communication device 102 may delay additional BSIC reconfirmations for the top ranked cells 118 for a time period 130 when the RLT counter 114 is greater than zero and less than the counter threshold 124.

In one implementation, the RLF recovery module 116 may start a delay timer 128 when the RLT counter 114 is less than the counter threshold 124. The delay timer 128 may be set to the time period 130 of the BSIC reconfirmation delay. In one embodiment, the wireless communication device 102 may delay additional BSIC reconfirmations for 5 seconds. The wireless communication device 102 may not perform additional BSIC reconfirmations until expiration of the delay timer 128.

In one embodiment, the RLF recovery module 116 may be implemented by a radio resource (RR) layer of the wireless communication device 102. The RR layer may keep track of the RLT counter 114 and may be aware of the neighbor cell list 110. Furthermore, the RR layer may be aware of the ranks of the neighbor cells 108 based on the Rx level. The cells for which BSIC is decoded and reconfirmed may be marked as known cells, the remaining cells are unknown.

When the RLT counter 114 is less than the counter threshold 124, the RR layer may send a BSIC reconfirmation request for the top ranked cells 118 in the neighbor cell list 110 to a GERAN layer 1 (GL1) of the wireless communication device 102. The GL1 may schedule the BSIC reconfirmation.

The systems and methods described herein may help the wireless communication device 102 select a cell faster. Furthermore, call re-establishment may also be faster. The measurements (e.g., BSIC reconfirmation and SNR 120) are made in dedicated mode. Therefore, power is saved as a power scan after RLF may be avoided. Furthermore, DSDS phones may experience faster camping on SUB2, especially after long-duration call drops.

Figure 2:
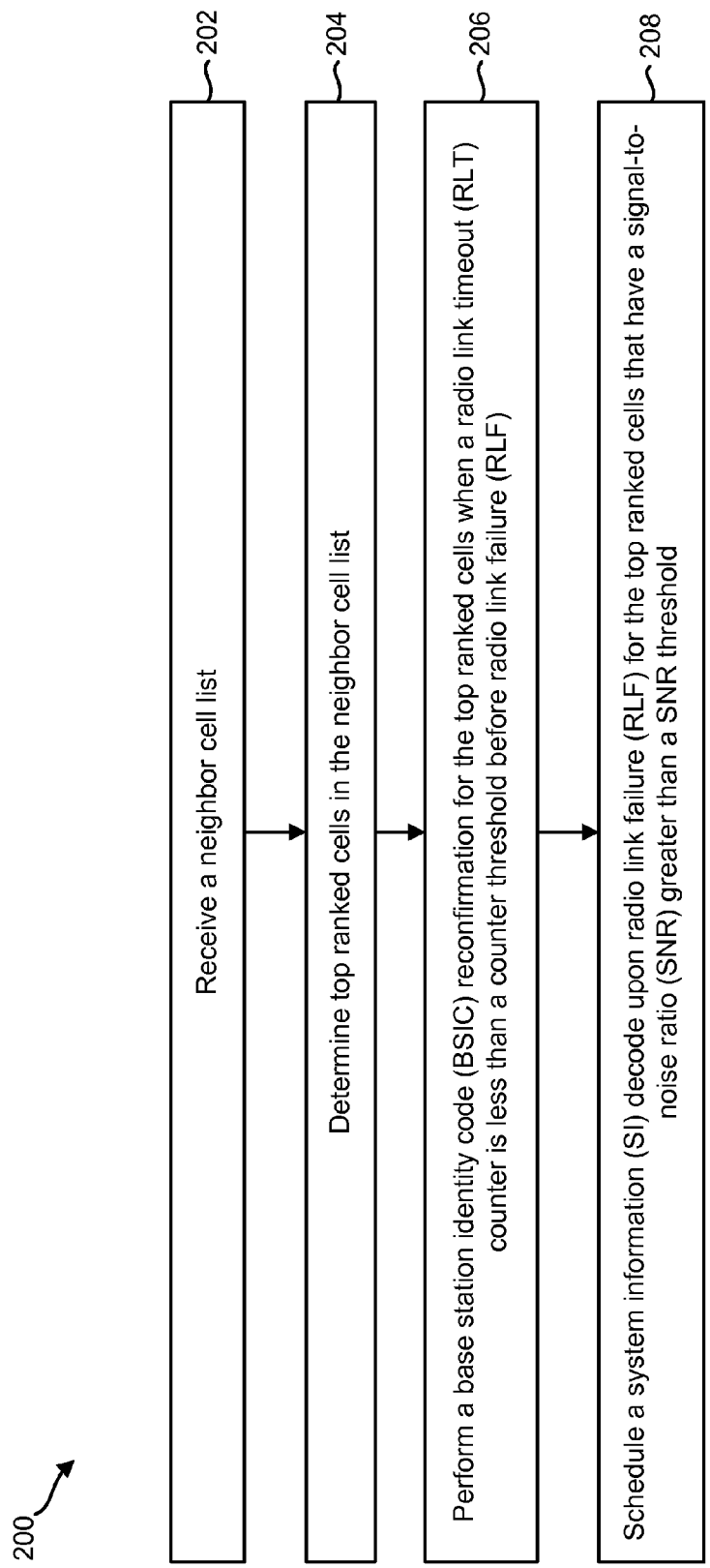
FIG. 2 is a flow diagram of a method for recovery after RLF according to some embodiments.

FIG. 2 is a flow diagram of a method 200 for recovery after radio link failure (RLF) according to some embodiments. The method 200 may be performed by a wireless communication device 102. For example, the method 200 may be performed by a RLF recovery module 116. The wireless communication device 102 may be camped on a serving cell 106. In one embodiment, the method 200 may performed by a wireless communication device 102 in a GSM network.

The wireless communication device 102 may receive 202 a neighbor cell list 110. The neighbor cell list 110 may be received from the serving cell 106. The neighbor cell list 110 may include neighbor cell IDs 112 that identify the neighbor cells 108. The neighbor cell IDs 112 may include frequencies of the neighbor cells 108. In one embodiment, the neighbor cell list 110 may be a BA list. The neighbor cell IDs 112 may be ARFCNs associated with the neighbor cells 108.

The wireless communication device 102 may determine 204 top ranked cells 118 in the neighbor cell list 110. The wireless communication device 102 may evaluate the Rx levels of the cells in the neighbor cell list 110 and may sort the neighbor cells 108 by Rx level. The wireless communication device 102 may determine a number of top ranked cells 118 with the highest Rx level. The number of top ranked cells 118 may be configurable. In one embodiment, the number of top ranked cells 118 is 3. The wireless communication device 102 may determine that the Rx level of the top ranked cells 118 is better (e.g., greater) than an Rx level threshold 122.

The wireless communication device 102 may perform 206 a BSIC reconfirmation for the top ranked cells 118 when a RLT counter 114 is less than a counter threshold 124 before RLF. The wireless communication device 102 may keep track of the RLT counter 114. The RLT counter 114 may be incremented or decremented based on SACCH decoding. The RLT counter 114 may be reduced by 1 for every DL SACCH decode failure. The RLT counter 114 may be increased by 2 for every successful decode until the defined value of the RLT counter. The wireless communication device 102 may declare a RLF once the RLT counter 114 becomes zero.

The counter threshold 124 may be a value of the RLT counter 114 greater than zero. In one embodiment, the counter threshold 124 may be 2. When the RLT counter 114 is less than the counter threshold 124 before RLF, the wireless communication device 102 may perform 206 a BSIC reconfirmation for the top ranked cells 118. As part of the BSIC reconfirmation, the wireless communication device 102 may decode the synchronization channel (SCH) of one or more top ranked cells 118. From the SCH decoding, the wireless communication device 102 may determine the SNR 120 of the one or more top ranked cells 118.

The wireless communication device 102 may perform 206 the BSIC reconfirmation for the top ranked cells 118 when the wireless communication device 102 is in dedicated mode. In other words, while the wireless communication device 102 is still in a voice call or data call, the wireless communication device 102 may perform the BSIC reconfirmation for the top ranked cells 118.

The wireless communication device 102 may schedule 208 a system information (SI) decode upon RLF for the top ranked cells 118 that have an SNR 120 greater than an SNR threshold 126. When the RLT counter 114 reaches zero (e.g., RLF is declared), the wireless communication device 102 may decode SI of the top ranked cells 118 that have an SNR 120 greater than the SNR threshold 126. To avoid the scenario where one or more top ranked cells 118 have poor SNR 120, the SNR threshold 126 may be kept to greater than 6 dB. Once the wireless communication device 102 decodes the SI of top ranked cells 118, the wireless communication device 102 may attempt to camp on the neighbor cell 108 with the highest SNR 120.

Figure 3:
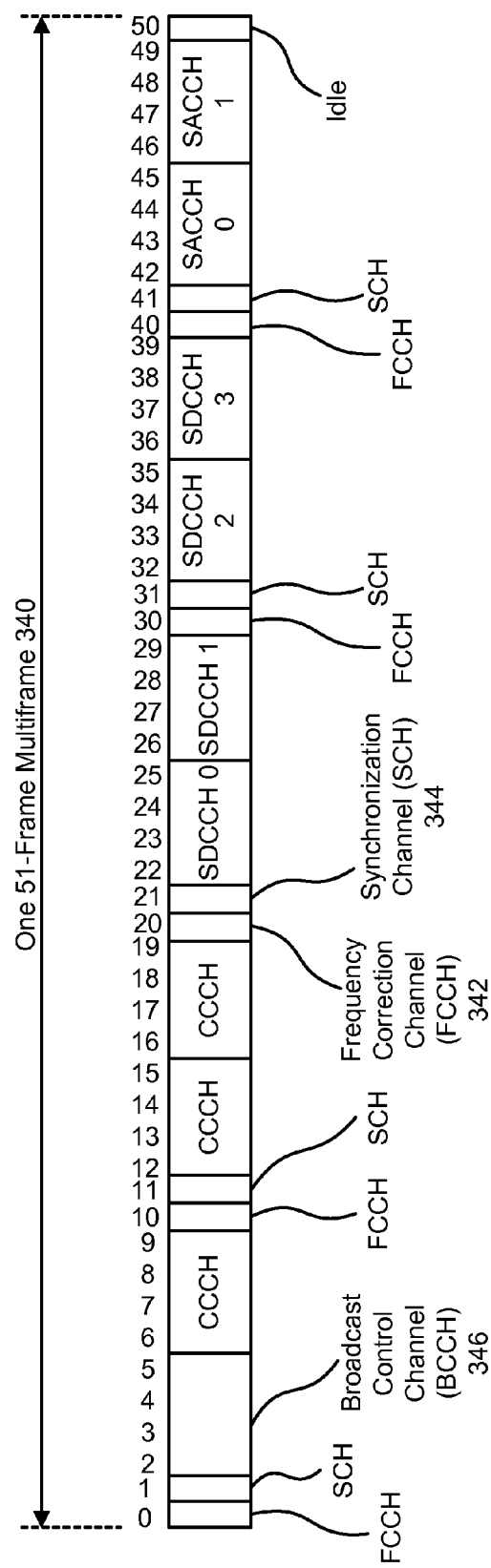
FIG. 3 is a block diagram illustrating a 51-frame multi-frame for use in the present systems and methods.

FIG. 3 is a block diagram illustrating a 51-frame multiframe 340 for use in the present systems and methods. The 51-frame multiframe 340 may be from a cell (e.g., the ARFCN of a neighbor cell 108). Different channels may be mapped to different frames within the 51-frame multiframe 340. For example, a frequency correction channel (FCCH) 342 may be mapped to the first frame (frame 0). A synchronization channel (SCH) 344 may immediately follow the FCCH 342. The broadcast control channel (BCCH) 346 may be mapped to frames 2 through 5. The mapping of the channels to specific frames may be fixed by the specification.

The FCCH 342 may be repeated every 10 frames (approximately every 50 ms). In one configuration, the FCCH 342 may include an all-zero sequence that produces a fixed tone. In some implementations, the fixed tone is 67 kHz. This tone enables the wireless communication device 102 to lock its local oscillator to the base station 104 clock tone.

Once the FCCH 342 is found (e.g., acquired), the next frame (4.6 ms later) will be the SCH 344. The SCH 344 may allow the wireless communication device 102 to synchronize the timing of the wireless communication device 102 with the base station 104.

The 51-frame multiframe 340 may also include other information. This information may include the common control channel (CCCH), the stand-alone dedicated control channel (SDCCH) and the slow associated control channel (SACCH).

Figure 4:
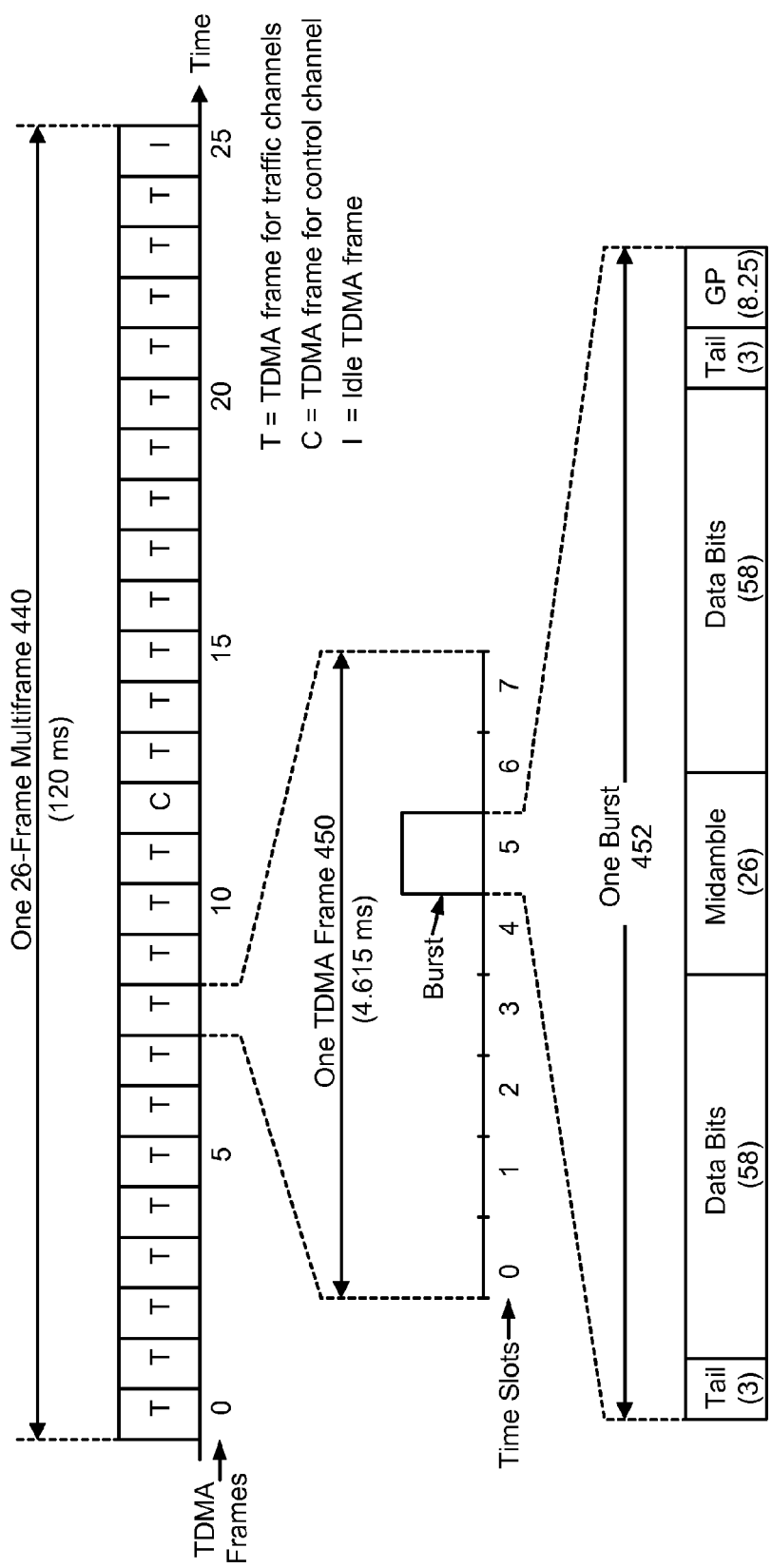
FIG. 4 shows example frame and burst formats in global system for mobile communications (GSM)

FIG. 4 shows example frame 450 and burst 452 formats in GSM. The timeline for transmission is divided into multiframes 440. For traffic channels used to transmit user-specific data, each multiframe 440 in this example includes 26 TDMA frames 450, which are labeled as TDMA frames 0 through 25. The traffic channels, in this example, are sent in TDMA frames 0 through 11 and TDMA frames 13 through 24 of each multiframe 440 (other mappings are possible using half-rate channels or Voice services over Adaptive Multi-user channels on One Slot (VAMOS)). A control channel is sent in TDMA frame 12. No data is sent in idle TDMA frame 25, which is used by the wireless communication devices 102 to make measurements of signals transmitted by neighbor base stations 104.

Each time slot within a frame 450 is also referred to as a "burst" 452 in GSM. Each burst 452, in this example, includes two tail fields, two data fields, a training sequence (or midamble) field and a guard period (GP). The number of symbols in each field is shown inside the parentheses. A burst 452 includes symbols for the tail, data, and midamble fields. No symbols are sent in the guard period. TDMA frames of a particular carrier frequency are numbered and formed in groups of 26 or 51 TDMA frames 450 called multiframes 440.

Figure 5:
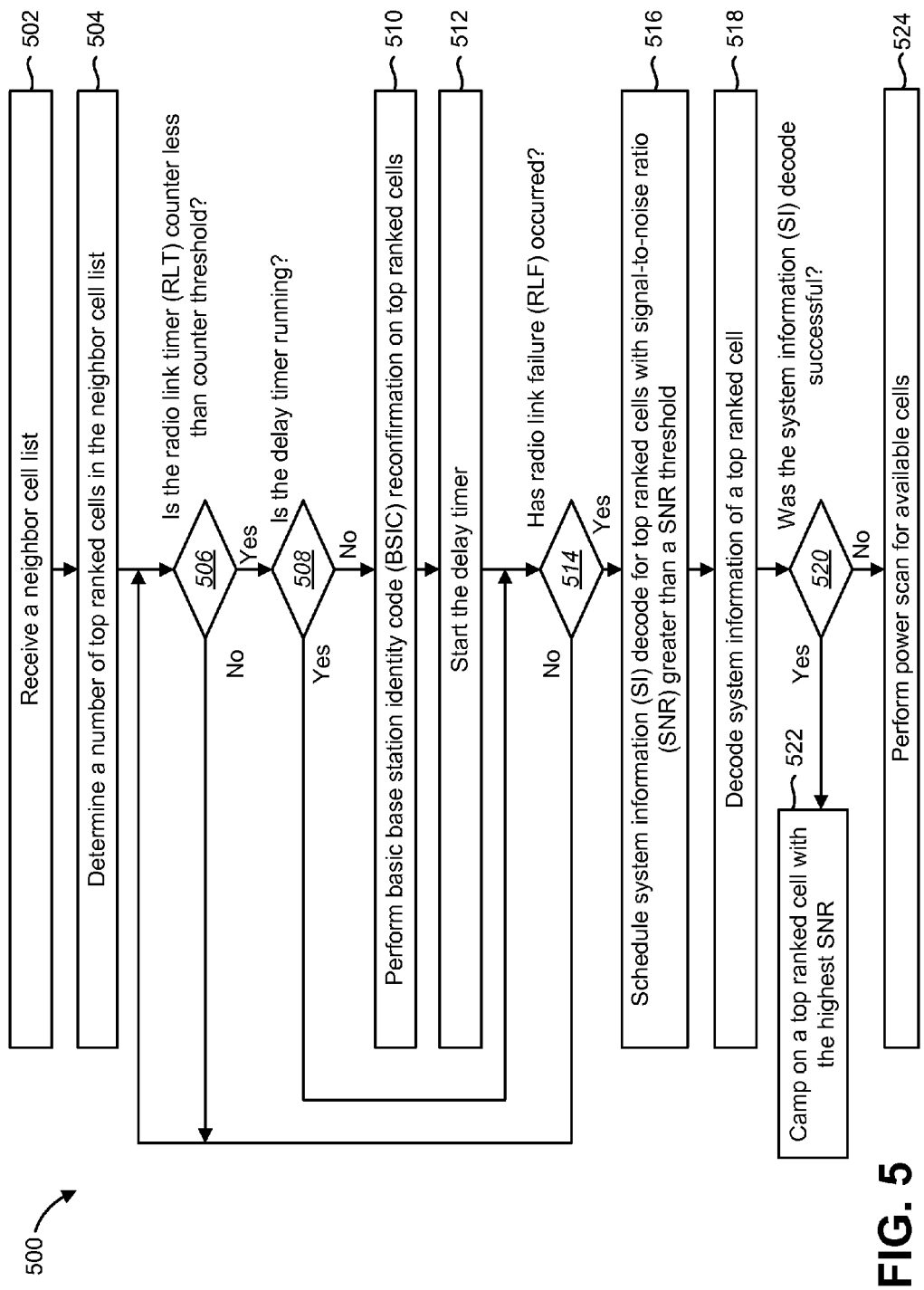
FIG. 5 is a flow diagram of a method for recovery after RLF according to a detailed embodiment.

FIG. 5 is a flow diagram of a method 500 for recovery after RLF according to a detailed embodiment. The method 500 may be performed by a wireless communication device 102. For example, the method 500 may be performed by a RLF recovery module 116. The wireless communication device 102 may be camped on a serving cell 106. In one implementation, the method 500 may performed by a wireless communication device 102 in a GSM network.

The wireless communication device 102 may receive 502 a neighbor cell list 110. The neighbor cell list 110 may be received from the serving cell 106. The neighbor cell list 110 may include neighbor cell IDs 112 that identify the neighbor cells 108. The neighbor cell IDs 112 may include frequencies of the neighbor cells 108. In one embodiment, the neighbor cell list 110 may be a BA list. The neighbor cell IDs 112 may be ARFCNs associated with the neighbor cells 108.

The wireless communication device 102 may determine 504 a number of top ranked cells 118 in the neighbor cell list 110. The wireless communication device 102 may determine 504 the top ranked cells 118 based on receive (Rx) levels of cells in the neighbor cell list 110. This may be accomplished as described in connection with FIG. 1. For example, the wireless communication device 102 may evaluate the Rx levels of the cells in the neighbor cell list 110 and sort the neighbor cells 108 by Rx level.

The wireless communication device 102 may determine 506 whether a RLT counter 114 is less than a counter threshold 124. The RLT counter 114 may be incremented or decremented based on SACCH decoding. The RLT counter 114 may be reduced by 1 for every DL SACCH decode failure. The RLT counter 114 may be increased by 2 for every successful decode until the defined value of the RLT counter. The counter threshold 124 may be a value of the RLT counter 114 greater than zero.

If the RLT counter 114 is not less than a counter threshold 124, then the wireless communication device 102 may continue to evaluate the RLT counter 114. When the wireless communication device 102 determines 506 that the RLT counter 114 is less than the counter threshold 124, then the wireless communication device 102 may determine 508 whether a delay timer 128 is running.

If the delay timer 128 is not running, then the wireless communication device 102 may perform 510 a BSIC reconfirmation for the top ranked cells 118. As part of the BSIC reconfirmation, the wireless communication device 102 may decode the synchronization channel (SCH) of one or more top ranked cells 118. From the SCH decoding, the wireless communication device 102 may determine the SNR 120 of the one or more top ranked cells 118. The wireless communication device 102 may perform 510 the BSIC reconfirmation for the top ranked cells 118 when the wireless communication device 102 is in dedicated mode.

The wireless communication device 102 may start 512 the delay timer 128. To avoid a ping pong effect, the wireless communication device 102 may delay additional BSIC reconfirmations for the top ranked cells 118 for a time period 130 when the RLT counter 114 is greater than zero and less than the counter threshold 124.

The wireless communication device 102 may determine 514 whether RLF has occurred. This may be accomplished by determining whether the RLT counter 114 equals zero. If the RLF has not occurred (when the RLT counter 114 is greater than zero, for instance), then the wireless communication device 102 may continue to evaluate 506 the RLT counter 114.

If the RLT counter 114 is less than the counter threshold 124, then the wireless communication device 102 may determine 508 whether the delay timer 128 is running. If the delay timer 128 is running (e.g., because of an earlier BSIC reconfirmation), then the wireless communication device 102 may determine 514 whether RLF has occurred.

Upon RLF, the wireless communication device 102 may schedule 516 a system information (SI) decode for the top ranked cells 118 that have an SNR 120 greater than an SNR threshold 126. At the scheduled time, the wireless communication device 102 may decode 518 decode SI of at least one of the top ranked cells 118.

The wireless communication device 102 may determine 520 whether the SI decode was successful. If the SI decode was successful for at least one of the top ranked cells 118, then the wireless communication device 102 may use the SI to camp 522 on the top ranked cell 118 with the highest SNR 120.

If the SI decode was not successful for any of the top ranked cells 118, then the wireless communication device 102 may perform a power scan for available cells. The wireless communication device 102 may first perform 524 a power scan of the remaining cells in the neighbor cell list 110. If no suitable cells are identified, the wireless communication device 102 may perform a full power scan.

Figure 6:
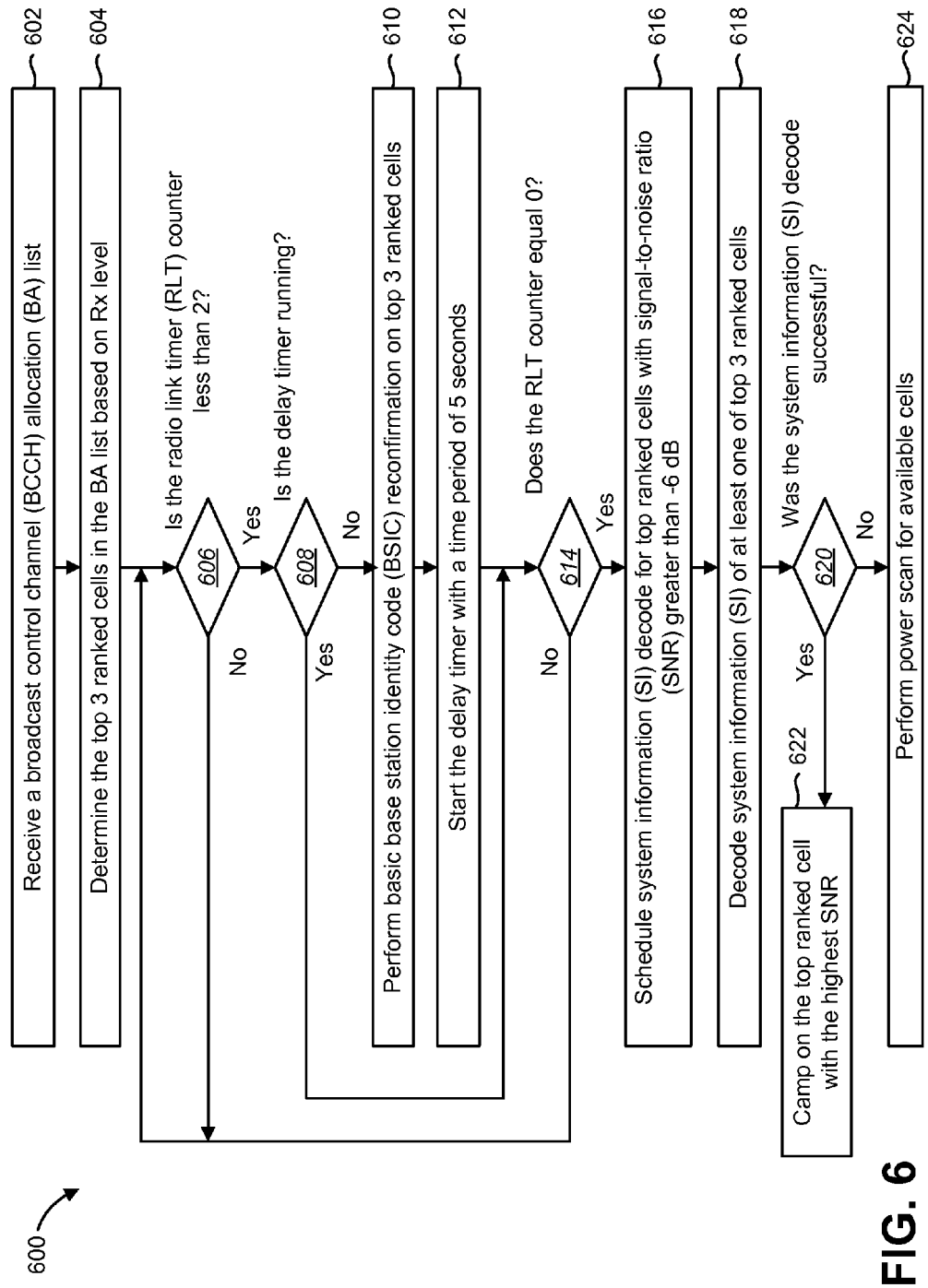
FIG. 6 is a flow diagram of a method for recovery after RLF according to another detailed embodiment.

FIG. 6 is a flow diagram of a method 600 for recovery after RLF according to another detailed embodiment. The method 600 may be performed by a wireless communication device 102. For example, the method 600 may be performed by a RLF recovery module 116. The wireless communication device 102 may be camped on a serving cell 106. In one implementation, the method 600 may performed by a wireless communication device 102 in a GSM network.

The wireless communication device 102 may receive 602 a broadcast control channel (BCCH) allocation (BA) list. The BA list may be one implementation of a neighbor cell list. The BA list may be received from the serving cell 106. The wireless communication device 102 may receive the BA list in a system information block type 5 (SIB 5) through a downlink (DL) slow associated control channel (SACCH).

The wireless communication device 102 may determine 604 the three top ranked cells 118 in the BA list. The wireless communication device 102 may determine 604 the three top ranked cells 118 based on receive (Rx) levels of cells in the BA list. This may be accomplished as described in connection with FIG. 1. For example, the wireless communication device 102 may evaluate the Rx levels of the cells in the BA list and sort the neighbor cells 108 by Rx level. The wireless communication device 102 may select the three neighbor cells 108 that have the highest Rx level as the three top ranked cells 118. To reduce the chance of cell selection failure after RLF, the Rx level of the three top ranked cells 118 should be better than −107 dBm.

The wireless communication device 102 may determine 606 whether a RLT counter 114 is less than 2. The RLT counter 114 may be incremented or decremented based on SACCH decoding. The RLT counter 114 may be reduced by 1 for every DL SACCH decode failure. The RLT counter 114 may be increased by 2 for every successful decode until the defined value of the RLT counter.

If the RLT counter 114 is not less than 2, then the wireless communication device 102 may continue to evaluate the RLT counter 114. When the wireless communication device 102 determines 606 that the RLT counter 114 is less than 2, then the wireless communication device 102 may determine 608 whether a delay timer 128 is running.

If the delay timer 128 is not running, then the wireless communication device 102 may perform 610 a BSIC reconfirmation for the three top ranked cells 118. As part of the BSIC reconfirmation, the wireless communication device 102 may decode the synchronization channel (SCH) of one or more of the three top ranked cells 118. From the SCH decoding, the wireless communication device 102 may determine the SNR 120 for one or more of the three top ranked cells 118. The wireless communication device 102 may perform 610 the BSIC reconfirmation for the three top ranked cells 118 when the wireless communication device 102 is in dedicated mode.

The wireless communication device 102 may start 612 the delay timer 128 with a time period of 5 seconds. The wireless communication device 102 may delay additional BSIC reconfirmations for the three top ranked cells 118 for 5 seconds when the RLT counter 114 is greater than zero.

The wireless communication device 102 may determine 614 whether the RLT counter 114 equals zero. If the RLT counter 114 is greater than zero (e.g., RLF has not occurred), then the wireless communication device 102 may continue to evaluate 606 the RLT counter 114.

If the RLT counter 114 is less than 2, then the wireless communication device 102 may determine 608 whether the delay timer 128 is running. If the delay timer 128 is running (e.g., because of an earlier BSIC reconfirmation), then the wireless communication device 102 may again determine 614 whether the RLT counter 114 equals zero.

Upon RLF (e.g., when the RLT counter 114 equals zero), the wireless communication device 102 may schedule 616 a system information (SI) decode for one or more of the three top ranked cells 118 that have an SNR 120 greater than 6 dB. At the scheduled time, the wireless communication device 102 may decode 618 decode SI of at least one of the three top ranked cells 118.

The wireless communication device 102 may determine 620 whether the SI decode was successful. If the SI decode was successful for at least one of the three top ranked cells 118, then the wireless communication device 102 may use the SI to camp 622 on the top ranked cell 118 with the highest SNR 120.

If the SI decode was not successful for any of the three top ranked cells 118, then the wireless communication device 102 may perform a power scan for available cells. The wireless communication device 102 may first perform a power scan of the remaining cells (e.g., the non-top ranked cells 118) in the neighbor cell list. If no suitable cells are identified, the wireless communication device 102 may perform 624 a full power scan.

Figure 7:
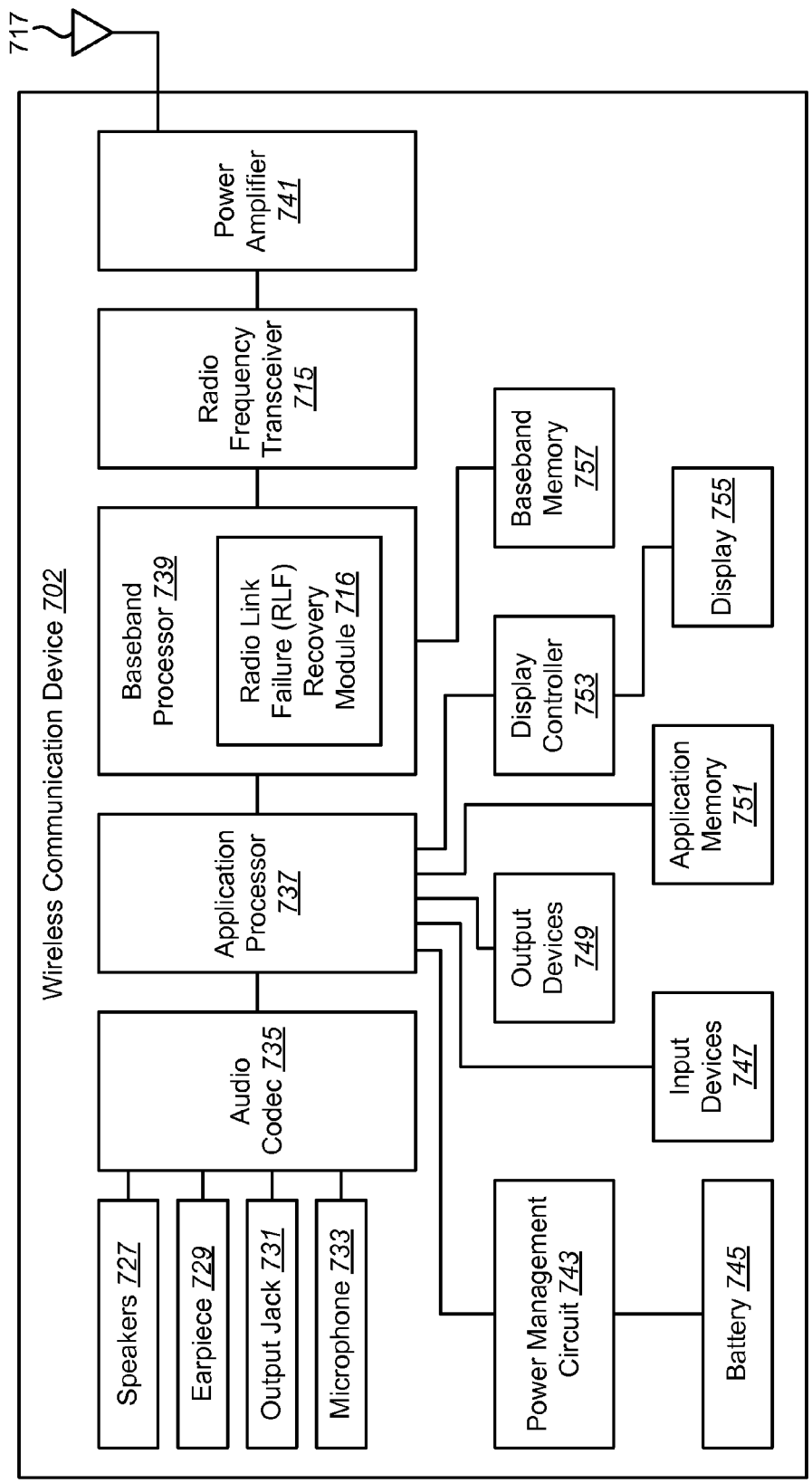
FIG. 7 is a block diagram illustrating one configuration of a wireless communication device in which systems and methods for recovery after RLF may be implemented according to some embodiments.

FIG. 7 is a block diagram illustrating one configuration of a wireless communication device 702 in which systems and methods for recovery after radio link failure (RLF) may be implemented according to some embodiments. The wireless communication device 702 illustrated in FIG. 7 may include the wireless communication device 102 and/or other devices/circuitries described above. The wireless communication device 702 may include an application processor 737. The application processor 737 generally processes instructions (e.g., runs programs) to perform functions on the wireless communication device 702. The application processor 737 may be coupled to an audio coder/decoder (codec) 735.

The audio codec 735 may be an electronic device (e.g., integrated circuit) used for coding and/or decoding audio signals. The audio codec 735 may be coupled to one or more speakers 727, an earpiece 729, an output jack 731 and/or one or more microphones 733. The speakers 727 may include one or more electro-acoustic transducers that convert electrical or electronic signals into acoustic signals. For example, the speakers 727 may be used to play music or output a speakerphone conversation, etc. The earpiece 729 may be another speaker or electro-acoustic transducer that can be used to output acoustic signals (e.g., speech signals) to a user. For example, the earpiece 729 may be used such that only a user may reliably hear the acoustic signal. The output jack 731 may be used for coupling other devices to the wireless communication device 702 for outputting audio, such as headphones. The speakers 727, earpiece 729 and/or output jack 731 may generally be used for outputting an audio signal from the audio codec 735. The one or more microphones 733 may be acousto-electric transducer that converts an acoustic signal (such as a user's voice) into electrical or electronic signals that are provided to the audio codec 735.

The application processor 737 may also be coupled to a power management circuit 743. One example of a power management circuit 743 is a power management integrated circuit (PMIC), which may be used to manage the electrical power consumption of the wireless communication device 702. The power management circuit 743 may be coupled to a battery 745. The battery 745 may generally provide electrical power to the wireless communication device 702. For example, the battery 745 and/or the power management circuit 743 may be coupled to one or more of the elements included in the wireless communication device 702.

The application processor 737 may be coupled to one or more input devices 747 for receiving input. Examples of input devices 747 include infrared sensors, image sensors, accelerometers, touch sensors, keypads, etc. The input devices 747 may allow user interaction with the wireless communication device 702. The application processor 737 may also be coupled to one or more output devices 749. Examples of output devices 749 include printers, projectors, screens, haptic devices, etc. The output devices 749 may allow the wireless communication device 702 to produce output that may be experienced by a user.

The application processor 737 may be coupled to application memory 751. The application memory 751 may be any electronic device that is capable of storing electronic information. Examples of application memory 751 include double data rate synchronous dynamic random access memory (DDRAM), synchronous dynamic random access memory (SDRAM), flash memory, etc. The application memory 751 may provide storage for the application processor 737. For instance, the application memory 751 may store data and/or instructions for the functioning of programs that are run on the application processor 737.

The application processor 737 may be coupled to a display controller 753, which in turn may be coupled to a display 755. The display controller 753 may be a hardware block that is used to generate images on the display 755. For example, the display controller 753 may translate instructions and/or data from the application processor 737 into images that can be presented on the display 755. Examples of the display 755 include liquid crystal display (LCD) panels, light emitting diode (LED) panels, cathode ray tube (CRT) displays, plasma displays, etc.

The application processor 737 may be coupled to a baseband processor 739. The baseband processor 739 generally processes communication signals. For example, the baseband processor 739 may demodulate and/or decode received signals. Additionally or alternatively, the baseband processor 739 may encode and/or modulate signals in preparation for transmission.

The baseband processor 739 may be coupled to baseband memory 757. The baseband memory 757 may be any electronic device capable of storing electronic information, such as SDRAM, DDRAM, flash memory, etc. The baseband processor 739 may read information (e.g., instructions and/or data) from and/or write information to the baseband memory 757. Additionally or alternatively, the baseband processor 739 may use instructions and/or data stored in the baseband memory 757 to perform communication operations.

The baseband processor 739 may include a radio link failure (RLF) recovery module 716 for recovery after RLF according to the systems and methods disclosed herein. The RLF recovery module 716 may be configured similarly to the RLF recovery module 116 described herein. Additionally or alternatively, the RLF recovery module 716 may perform one or more of the methods 200, 500, 600 and/or one or more of the functions described in connection with one or more of the RLF recovery module 116 described above. In some configurations, the RLF recovery module 716 may be alternatively implemented independently from the baseband processor 739.

The baseband processor 739 may be coupled to a radio frequency (RF) transceiver 715. The RF transceiver 715 may be coupled to a power amplifier 741 and one or more antennas 717. The RF transceiver 715 may transmit and/or receive radio frequency signals. For example, the RF transceiver 715 may transmit an RF signal using a power amplifier 741 and one or more antennas 717. The RF transceiver 715 may also receive RF signals using the one or more antennas 717.

Figure 8:
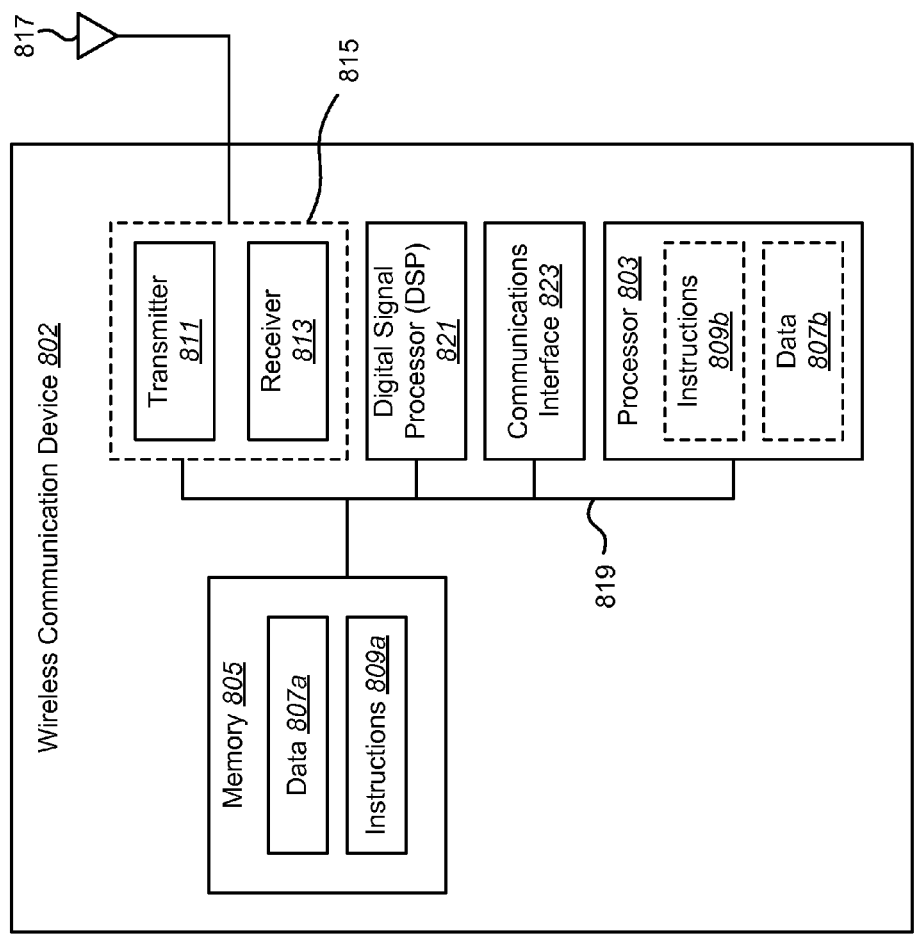
FIG. 8 illustrates certain components that may be included within a wireless communication device according to some embodiments.

FIG. 8 illustrates certain components that may be included within a wireless communication device 802 according to some embodiments. The wireless communication device 802 may be implemented in accordance with the wireless communication device 102 described above. The wireless communication device 802 may be an access terminal, a mobile station, a user equipment, etc. The wireless communication device 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Also, as is known by those skilled in the art, the processor 803 can be comprised of one or more of circuits, circuitry, partitioned memory, control unit, and the like. Still yet, the processor 803 may include input/output ports, memory buffers, and an ALU for performing instructions and data manipulation. Although just a single processor 803 is shown in the wireless communication device 802 of FIG. 8, in an alternative configuration, a combination of processors (e.g., an ARM and DSP) could be used.

The wireless communication device 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, erasable programmable read-only memory (EPROM), electrically erasable PROM (EEPROM), registers and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The wireless communication device 802 may also include a transmitter 811 and a receiver 813 to allow transmission and reception of signals to and from the wireless communication device 802. The transmitter 811 and receiver 813 may be collectively referred to as a transceiver 815. One or more antennas 817 may be electrically coupled to the transceiver 815. The wireless communication device 802 may also include (not shown) multiple transmitters, multiple receivers, multiple transceivers and/or additional antennas.

The wireless communication device 802 may include a digital signal processor (DSP) 821. The wireless communication device 802 may also include a communications interface 823. The communications interface 823 may allow a user to interact with the wireless communication device 802.

The various components of the wireless communication device 802 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 5, and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized. For example, some of the methods described herein may be performed by a processor, one or more local oscillators (LOs), a wideband receiver fast Fourier transform (FFT) hardware, software and/or firmware.

It is to be understood that the claims are not limited to the precise configuration and components illustrated above. Various modifications, changes and variations may be made in the arrangement, operation and details of the systems, methods, and apparatus described herein without departing from the scope of the claims.

I claim:

1. A method for wireless communication, comprising:
performing a base station identity code (BSIC) reconfirmation for a number of top ranked cells in a received neighbor cell list when a radio link timeout (RLT) counter is less than a counter threshold before radio link failure (RLF), wherein a signal-to-noise ratio (SNR) for the top ranked cells is determined during the BSIC reconfirmation; and
scheduling a system information (SI) decode upon RLF for the top ranked cells that have an SNR greater than an SNR threshold.

2. The method of claim 1, further comprising:
decoding, upon RLF, the SI of a top ranked cell with a highest SNR without performing a power scan; and
camping on the top ranked cell with the highest SNR.

3. The method of claim 1, further comprising delaying additional BSIC reconfirmations for the top ranked cells for a time period when the RLT counter is greater than zero and less than the counter threshold.

4. The method of claim 1, wherein the top ranked cells are determined based on receive levels of cells in the neighbor cell list.

5. The method of claim 1, wherein the BSIC reconfirmation for the top ranked cells is performed in a dedicated mode before RLF.

6. The method of claim 1, wherein the RLT counter is incremented or decremented based on slow associated control channel (SACCH) decoding.

7. The method of claim 1, wherein the counter threshold is 2, the number of top ranked cells is 3 cells, and the SNR threshold is −6 decibels.

8. The method of claim 1, wherein performing a BSIC reconfirmation comprises decoding a synchronization channel (SCH).

9. The method of claim 1, wherein the method is performed by a wireless communication device in a GSM network.

10. The method of claim 9, wherein the wireless communication device is a dual-SIM dual-standby (DSDS) device.

11. An electronic device for wireless communication, comprising:
a processor;
memory in electronic communication with the processor; and
instructions stored in the memory, the instructions being executable by the processor to:
perform a base station identity code (BSIC) reconfirmation for a number of top ranked cells in a received neighbor cell list when a radio link timeout (RLT) counter is less than a counter threshold before radio link failure (RLF), wherein a signal-to-noise ratio (SNR) for the top ranked cells is determined during the BSIC reconfirmation; and
schedule a system information (SI) decode upon RLF for the top ranked cells that have an SNR greater than an SNR threshold.

12. The electronic device of claim 11, further comprising instructions executable to:
decode, upon RLF, the SI of a top ranked cell with a highest SNR without performing a power scan; and
camp on the top ranked cell with the highest SNR.

13. The electronic device of claim 11, further comprising instructions executable to delay additional BSIC reconfirmations for the top ranked cells for a time period when the RLT counter is greater than zero and less than the counter threshold.

14. The electronic device of claim 11, wherein the top ranked cells are determined based on receive levels of cells in the neighbor cell list.

15. The electronic device of claim 11, wherein the BSIC reconfirmation for the top ranked cells is performed in a dedicated mode before RLF.

16. The electronic device of claim 11, wherein the RLT counter is incremented or decremented based on slow associated control channel (SACCH) decoding.

17. The electronic device of claim 11, wherein the instructions executable to perform a base BSIC reconfirmation comprise instructions executable to decode a synchronization channel (SCH).

18. A wireless device, comprising:
means for performing a base station identity code (BSIC) reconfirmation for a number of top ranked cells in a received neighbor cell list when a radio link timeout (RLT) counter is less than a counter threshold before radio link failure (RLF), wherein a signal-to-noise ratio (SNR) for the top ranked cells is determined during the BSIC reconfirmation; and means for scheduling a system information (SI) decode upon RLF for the top ranked cells that have an SNR greater than an SNR threshold.

19. The wireless device of claim 18, further comprising:
means for decoding, upon RLF, the SI of a top ranked cell with a highest SNR without performing a power scan; and
means for camping on the top ranked cell with the highest SNR.

20. The wireless device of claim 18, further comprising means for delaying additional BSIC reconfirmations for the top ranked cells for a time period when the RLT counter is greater than zero and less than the counter threshold.

21. The wireless device of claim 18, wherein the top ranked cells are determined based on receive levels of cells in the neighbor cell list.

22. The wireless device of claim 18, wherein the BSIC reconfirmation for the top ranked cells is performed in a dedicated mode before RLF.

23. The wireless device of claim 18, wherein the RLT counter is incremented or decremented based on slow associated control channel (SACCH) decoding.

24. The wireless device of claim 18, wherein the means for performing a BSIC reconfirmation comprise means for decoding a synchronization channel (SCH).

25. A computer-program product, the computer-program product comprising a non-transitory computer-readable medium having instructions thereon, the instructions comprising:
code for causing an electronic device to perform a base station identity code (BSIC) reconfirmation for a number of top ranked cells in a received neighbor cell list when a radio link timeout (RLT) counter is less than a counter threshold before radio link failure (RLF), wherein a signal-to-noise ratio (SNR) for the top ranked cells is determined during the BSIC reconfirmation; and
code for causing the electronic device to schedule a system information (SI) decode upon RLF for the top ranked cells that have an SNR greater than an SNR threshold.

26. The computer-program product of claim 25, further comprising:
code for causing the electronic device to decode, upon RLF, the SI of a top ranked cell with a highest SNR without performing a power scan; and
code for causing the electronic device to camp on the top ranked cell with the highest SNR.

27. The computer-program product of claim 25, further comprising code for causing the electronic device to delay additional BSIC reconfirmations for the top ranked cells for a time period when the RLT counter is greater than zero and less than the counter threshold.

28. The computer-program product of claim 25, wherein the top ranked cells are determined based on receive levels of cells in the neighbor cell list.

29. The computer-program product of claim 25, wherein the BSIC reconfirmation for the top ranked cells is performed in a dedicated mode before RLF.

30. The computer-program product of claim 25, wherein the code for causing the electronic device to perform a base BSIC reconfirmation comprises code for causing the electronic device to decode a synchronization channel (SCH).

* * * * *